E. SARTORIUS.
BALANCE.
APPLICATION FILED FEB. 24, 1913.
1,132,880.
Patented Mar. 23, 1915.
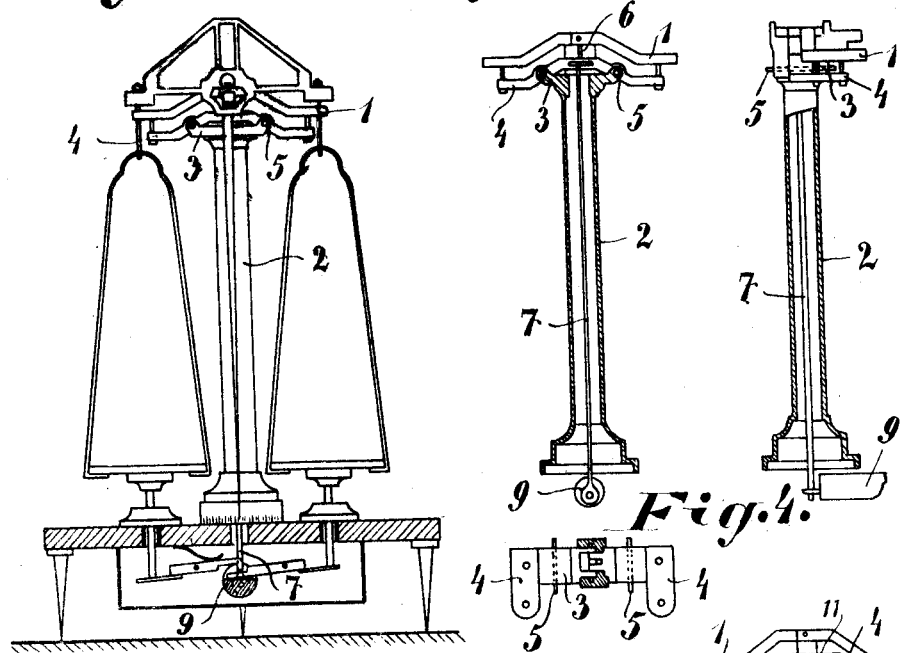

UNITED STATES PATENT OFFICE.

ERICH SARTORIUS, OF GÖTTINGEN, GERMANY.

BALANCE.

1,132,880. Specification of Letters Patent. Patented Mar. 23, 1915.

Application filed February 24, 1913. Serial No. 750,362.

*To all whom it may concern:*

Be it known that I, ERICH SARTORIUS, a subject of the Emperor of Germany, residing at Göttingen, Germany, have invented certain new and useful Improvements in Balances, of which the following is a specification.

This invention relates to balances and has for its primary object to provide an improved balance wherein certain defects inherent in devices of this description as hitherto constructed are avoided.

A further object of the invention is to provide means whereby a more ready weighing operation may be effected than has hitherto been practicable.

A still further object is to provide a balance with means for relieving the terminal knife edges of the weight of the scale pans or their equivalent when desired and whereby undue oscillations on the part of the scale beam may be avoided.

Another object of the invention is to provide a simple and efficient form of releasing and arresting mechanism for the scale beam.

It is usual to operate the releasing and arresting mechanism by means of a rod located in the main column of the balance, suitable guides being provided at the top and base of the column for holding the operating rod in position.

The raising and lowering of the balance beam effected by the releasing and arresting mechanism and also the raising and lowering of the terminal stirrups or pendants into their respective knife edges by the action of the rod located in the column of the balance is effected by a pair of arresting arms or brackets which are either pivotally mounted at their inner ends on the column of the balance and raised or lowered by a suitable under frame or bracket secured to the operating rod or the two arresting arms are constituted by a rigid cross bracket connected directly to the operating rod and extending outwardly on either side thereof.

The operating rod must under all circumstances be held tightly in its guides so that although free longitudinal displacement of the rod can be effected, angular displacement of the operating rod is avoided, inasmuch as angular displacement of the operating rod prevents simultaneous operation of the terminal stirrups and pendants. The operating rod must therefore under all circumstances be so guided that the balance beam and the terminal pendants are raised equally on both sides. This will be the case if when the terminal pendants and the scale beam are reset in position on their knife edges the pointer remains at zero on its scale when the balance is in equilibrium or when that arm of the scale beam carrying the greater weight immediately moves downward upon the scale beam being rendered free to oscillate. Accuracy of operation in this respect cannot usually be maintained in balances as heretofore constructed after they have been in use for a short time and experiments have shown that this defect is caused by wear in the guides or supports for the operating rod of the arresting mechanism, since when this operating rod becomes loose from wear an angular displacement of the rod and also of the relieving bracket is liable to occur particularly in cases in which the longitudinal displacement of the rod is effected by means of a cam or eccentric since with such an arrangement the lower end of the operating rod is forced by the action of the cam laterally against one side of the guide or support in the main column of the balance. This lateral movement of the operating rod produces a corresponding tilting of the arresting arms to which the operating rod is attached with the result that these arms are raised more on one side than on the other and uniform vertical movement of the arresting device is no longer assured.

The invention is illustrated in the accompanying drawings of which—

Figure 1 is a view partly in section of a scale or balance embodying the present invention. Figs. 2, 3 and 4 are views in front elevation, side elevation and plan respectively illustrating the essential parts of the balance constituting this invention. Figs. 5 and 6 are detail views on an enlarged scale of portions of the apparatus illustrated in the preceding figures, Fig. 7 being a view similar to Fig. 2 illustrating a modification, Fig. 8 being a detail view drawn to an enlarged scale illustrating a still further modification in the form of the portion of the apparatus illustrated in Fig. 7.

In previous constructions when considerable wear has occurred in the upper and lower bearings for the operating rod of the arresting mechanism the movement of the operating rod vertically downward so as to replace the pendants on their respective knife edges will cause one of the pendants to be placed in position before the other due to the fact that the pendants, when the scale beam rests in its arrested position, are separated from the knife edges by different distances. The question as to which of the knife edges will be first engaged by this pendant will depend upon whether the operating rod is tilted toward the right as shown in Fig. 2 or toward the left as shown in Fig. 2, the effect being in either case that as the scale beam is released it will be deflected by the pendant first coming into engagement with the corresponding terminal knife edge with the result that the pointer of the balance will, even though the scale beam would be in equilibrium when both the pendants were engaged by their knife edges, be deflected from its zero position due to the pendants not being simultaneously set in position. A wrong indication would thus be given by the pointer of the balance even though the loads in the two scale pans were exactly equal to one another. If, however, this is not the case, the initial release of the scale beam would not necessarily cause the pointer to move in a direction corresponding to the one of balance between the two loads for the reason already explained, namely that the scale beam is not necessarily truly horizontal when it is released and the pendants engage with their respective knife edges. It will now be seen that a wrong indication may be given by the pointer of the balance when the arresting mechanism is operated to free the scale beam and the latter is moreover liable to violent and injurious deflections due to the two pendants not simultaneously engaging with their respective knife edges, the latter disadvantage occurring in both types of arresting mechanism above described.

Referring now to Figs. 2 to 4, which illustrate as above stated a preferred form of the invention, the arresting mechanism is indicated as comprising two arresting arms 1 pivotally mounted upon the head of the column 2 of the balance. The head of this column is provided with two lugs 3 upon each of which is pivotally mounted a lever 4, the pivots being indicated at 5.

The arresting arms 1 are mounted in a recess in the head of the column as shown in Figs. 3, 4 and 5, this recess being provided with a pair of vertical grooves 6 which serve to guide the vertical movement of the operating rod 7. The upper end of the rod 7 is provided with a transverse pin 10 the outer ends of which lie within the grooves 6, the pin 10 also forming the means of attachment of the inner end of the levers 4 of the operating rod 7 as clearly shown in Figs. 5 and 6, the inner ends of the levers 4 being forked as clearly illustrated. The lower end of the operating rod 7 is provided with the usual eccentric 9 for causing the upward and downward movements of the operating rod and in order to avoid wear, the slots 6 may if desired be provided with sliding members secured to the pin 10.

Referring now to the modification shown in Fig. 7 the levers 4 are in this case arranged vertically one above the other, the lower lever 4 being provided with a curved or hemispherical projection 11 adapted to engage with the lower face of the upper lever 4. The operating rod 7 in this case engages with the lower lever 4 and its movement is transmitted through the projection 11 to the upper lever as will be clearly seen from an inspection of Fig. 7, the points of contact of the upper end of the operating rod 7 and of the projection 11 being arranged to be such that their distances from the pivots of the two levers 4 are always equal to one another.

In the modification illustrated in Fig. 8, the operating rod 7 is connected by means of a pin 12 to the upper lever 4, the inner end of this lever being cylindrical in form and adapted to engage with the inner end 13 of the other lever 4 so that when the operating rod 7 is moved in a downward direction both of the levers 4 will be moved to the same extent.

I claim as my invention:—

1. The combination in a balance of a scale beam, a device for rendering said scale beam operative and inoperative as desired, pivotally mounted members for effecting the vertical displacement of said device and means for effecting the simultaneous and equal movement of said pivotally mounted members about their pivots.

2. The combination in a balance of a scale beam, a device for rendering said scale beam operative and inoperative as desired, a number of pivotally mounted levers for actuating said device, a vertically movable member for actuating said levers effecting the simultaneous and equal movement of said levers independent of wear on said member.

3. The combination in a balance of a scale beam, a device for permitting and arresting the oscillation of said beam, a number of pivotally mounted levers for effecting the operation of said device and means for effecting the simultaneous actuation of said levers regardless of wear.

4. The combination in a balance of a scale beam, a column for supporting said scale beam, a device mounted in the head of said column for arresting the oscillations of said scale beam, pivotally mounted levers located on the underside of said device and means for effecting a simultaneous and equal movement of said levers.

5. The combination in a balance of a scale beam, a column for supporting said beam, a device mounted on said column for arresting the oscillations of said beam a number of levers pivotally mounted on said column and adapted to actuate said device, an operating rod located within said column and operatively connected to said levers and means situated at the base of said column for actuating said operating rod.

6. The combination in a balance of a scale beam, a column for supporting said scale beam, a device located at the head of said column for arresting the movement of the scale beam, a number of pivotally mounted levers located at the upper portion of the column for transmitting motion to the arresting device and means for insuring that the two sides of the arresting device are maintained at the same level during its operation.

7. The combination in a balance of a scale beam, pivotally mounted members for arresting the oscillations of said beam and pivotally mounted levers for effecting the actuation of said members.

8. The combination in a balance of a scale beam, a supporting column therefor, a pair of arms pivotally mounted on said column for arresting the oscillations of said beam and a pair of levers also pivotally mounted on said column for effecting the actuation of said arms.

9. The combination in a balance of a scale beam, a column for supporting said scale beam, a pair of pivoted arms located at the head of said column for arresting the movement of said scale beam, a pair of pivoted levers located underneath said arms and means for effecting a corresponding angular displacement of each of said levers to actuate said arms.

10. The combination in a balance of a scale beam, a column for supporting said beam, a pair of pivotally mounted arms mounted in the head of said column, a pair of pivotally mounted levers carried in lugs attached to said column, an operating rod located within said column for effecting the rotation of said pivoted levers and means for guiding the inner ends of the pivotally mounted levers during operation.

11. The combination in a balance of a scale beam, a column for supporting said beam, a pair of arms pivotally mounted in the head of said column, a pair of levers pivotally mounted in lugs adjacent to the head of said column and adapted to engage at their outer ends with the pivotally mounted arms, an operating rod located within said column, a connecting link between the inner ends of said levers and said connecting rod and adapted to move within a vertical groove in the head of said column and an eccentric device located in the base of said column for effecting the operation of said operating rod.

12. The combination in a balance of a scale beam, a column for supporting said beam, a rod located within the interior of said column for effecting the operation of an arresting device, a pair of pivoted levers operated by said rod and means for insuring that the movement of one lever is accompanied by a corresponding movement of the other lever.

In testimony whereof I have hereunto set my hand in presence of two subscribing witnesses.

ERICH SARTORIUS.

Witnesses:
  F. A. FIELMYER,
  GUSTAV BUSSE.